United States Patent [19]
Arai

[11] Patent Number: 5,980,192
[45] Date of Patent: Nov. 9, 1999

[54] TABLE FEEDER

[75] Inventor: Shigehiro Arai, Narashino, Japan

[73] Assignee: Seiko Seiki Kabushiki Kaisha, Japan

[21] Appl. No.: 08/057,989

[22] Filed: May 5, 1993

[51] Int. Cl.$^6$ ................................................... B65G 35/00
[52] U.S. Cl. .............................................. 414/749; 108/143
[58] Field of Search ........................... 414/749; 269/164, 269/73, 285, 309; 29/402.03, 402.08; 74/89.15; 68/138, 143, 20

[56] References Cited

U.S. PATENT DOCUMENTS

| | | | |
|---|---|---|---|
| 4,442,725 | 4/1984 | Urabe | 74/89.15 |
| 4,988,261 | 1/1991 | Blatt | 414/749 |
| 5,054,991 | 10/1991 | Kato | 414/783 |

*Primary Examiner*—Donald W. Underwood
*Attorney, Agent, or Firm*—Adams & Wilks

[57] ABSTRACT

A table feeder apparatus comprises a base, a feed screw rotatably supported on the base and a motor for rotating the feed screw about a feed axis. A feed nut is mounted on the feed screw and a block is mounted integrally with the feed nut. A table is disposed on the block for movement along the feed axis. In one aspect, a slide mechanism is disposed between the block and the table. The slide mechanism is slidable in at least one of a horizontal direction and a vertical direction transverse to the feed axis. During movement of the table, the slide mechanism slides to absorb a force applied to the feed nut, tending to displace the block and table in a direction transverse to the feed axis, to prevent the applied force from being transmitted to the table. In another aspect, the table is provided with an opening in which a table portion is removably fitted. Removal of the table portion facilitates maintenance of the slide mechanism without requiring the entire table feeder structure to be dismantled.

15 Claims, 5 Drawing Sheets

TABLE FEEDER

BACKGROUND OF THE INVENTION

The present invention relates to a table feeder apparatus for reciprocating a table equipped in a machine tool. Conventionally, such a type of table feeder has a feed screw such as a ball screw, and a feed nut engaging with the feed screw. While the feed screw is rotated by a motor around its axis, the feed nut integrally mounts thereon a block, which is directly attached to the table. Further, respective guide rails are disposed on the left and right sides transversely of the feed screw for guiding the table in the axial direction of the feed screw. The table has a guide piece which is engaged slideably on a guide face of each guide rail. Such a type of table feeder is operated to reciprocate the table together with the feed nut and the block in the axial direction of the feed screw, by rotating the feed screw through the motor.

However, in the conventional table feeder apparatus, the table is directly attached to the block as noted above, and the table receives through the block a subsidiary force in response to angular deflection of the feed nut. The guide rail is deformed by such a deflective force so that the table suffers from deviation due to the angular deflection of the feed nut. This occurs in the case that a surface of the guide rail has a relatively low rigidity even though the guide rail surface is worked precisely to secure its straight shape as accurate as possible. Therefore, linearity of the displacement of the table (hereinafter, "displacement linearity") is degraded, thereby failing to reciprocate the table accurately.

Conventionally, in order to ensure the displacement linearity of the table, the guide rail is enlarged to increase rigidity of the guide surface. However, an overall dimension of a machine is limited to a practical size, hence the guide rail cannot be enlarged unusually over a certain limit. Therefore, particularly in the case of utilizing a long and thick feed screw in the conventional table feeder having a compact size table, the guide rail may be deformed by the deflective force so that the table tends to deviate in response to the angular deflection of the feed nut to thereby degrade the displacement linearity of the table, due to various structural factors such as excessive rigidity of the thick feed screw, bending of the long feed screw, small dimension of the guide rail and poor rigidity of the thin table.

SUMMARY OF THE INVENTION

In view of the above noted drawbacks, an object of the present invention is to improve the displacement linearity of a table in a table feeder apparatus to accurately reciprocate the table without increasing excessively the rigidity of the guide rail, and additionally to facilitate maintenance work of the table feeder apparatus.

In order to achieve the above noted object, according to a first aspect of the invention, the table feeder apparatus generally includes a feed screw supported rotatably, a motor for rotating the feed screw around its axis, a feed nut engaging around the feed screw, a block mounted integrally with the feed nut, and a guide rail for guiding a table in an axial direction of the feed screw. The table feeder apparatus is characterized by at least one of a horizontal slide mechanism and a vertical slide mechanism coupling the block and the table with each other and being disposed slideably in leftward and rightward directions or upward and downward directions along a sectional plane of the feed screw.

According to a second aspect of the invention, the table feeder apparatus generally includes a feed screw supported rotatably, a motor for rotating the feed screw around its axis, a feed nut engaging around the feed screw, a block mounted integrally with the feed nut, and a guide rail for guiding a table in an axial direction of the feed screw. The table feeder apparatus is characterized by an intermediate coupling member disposed between the block and the table, a horizontal slide mechanism connecting between the intermediate coupling member and the block, and being disposed slideably in leftward and rightward directions along a sectional plane of the feed screw, and a vertical slide mechanism connecting between the intermediate coupling member and the table, and being disposed slideably in upward and downward directions along a sectional plane of the feed screw.

In a preferred form as a third aspect of the invention, the table is formed with a draw opening for drawing or removing the block, and has a separate block table detachably fitted into the draw opening, and the horizontal slide mechanism connects the separate block table and the block with each other. In another preferred form, the table is formed with a draw opening for drawing or removing the block and has a separate block table detachably fitted into the draw opening, and the vertical slide mechanism connects the separate block table and the intermediate coupling member with each other.

According to the first aspect of the invention, when the block is deviated due to angular deflection of the feed nut in leftward and rightward directions or upward and downward directions along a sectional plane of the feed screw, the horizontal and vertical slide mechanisms slide correspondingly to that deviation amount in the leftward/rightward and upward/downward directions, respectively, sectionally of the feed screw, thereby absorbing the deviation of the block.

According to the second aspect of the invention, when the block is deviated due to angular deflection of the feed nut in both of the leftward and rightward directions, and upward and downward directions along a sectional plane of the feed screw, the horizontal and vertical slide mechanism slides correspondingly to that deviation amount in the leftward/rightward and upward/downward directions sectionally of the feed screw, thereby absorbing the deviation of the block.

According to the third aspect of the invention, after removing the feed nut and the feed screw from the block, the separate block table is detached from the draw opening. Then, there can be taken out through the draw opening the horizontal slide mechanism, block and nut together with the separate block table, or the vertical slide mechanism, intermediate coupling member, horizontal slide mechanism and block together with the separate block table.

DETAILED DESCRIPTION OF THE EMBODIMENTS

Hereinafter, embodiments of the inventive table feeder apparatus will be described in detail with reference to FIGS. 1–5. The same reference is utilized to denote the same component throughout various embodiments. As shown on FIG. 1, the table feeder apparatus utilizes a ball screw 2 as a feed screw disposed on a base 1. The ball screw 2 is supported rotatably at its opposite ends by means of bearings 3, 4. A motor 5 is disposed around one end of the ball screw 2, and a rotational shaft 6 of the motor 5 is connected to the ball screw 2 by means of a joint (not shown). A feed nut 7 is engaged with the ball screw 2, while a block 8 is integrally mounted on the feed nut 7 to undergo feeding movement along a feed axis corresponding to the axis of the feed screw 2. Further, a table 9 is disposed over the block 8, and a fitting plate 10 is integrally attached under the table 9.

Figure 1:
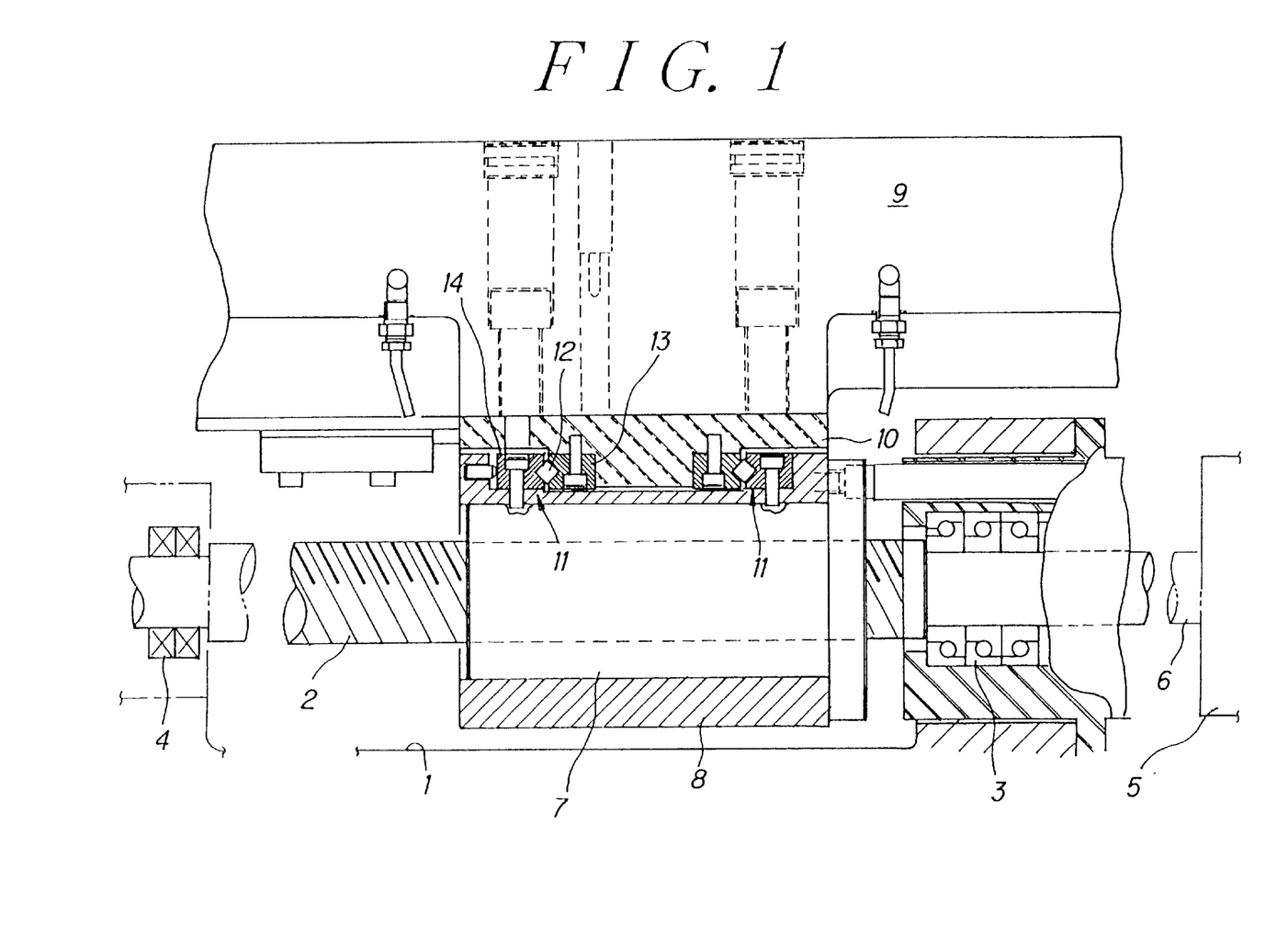
FIG. 1 is a front view of a first embodiment of the inventive table feeder.

Further, a horizontal slide mechanism is provided in the form of a pair of roller guides 11, 11 between the block 8 and the fitting plate 10 of the table 9. Each roller guide 11 is composed of a chain 12, and a pair of guide rails 13, 14 engaged slideably on both sides of the chain 12. One guide rail 13 has one end disposed rightward sectionally of the ball screw 2 and another end disposed leftward sectionally of the ball screw 2, and is fixed to the fitting plate 10 by a screw. The other guide rail 14 is fixed to the block 8 by screw in parallel to the guide rail 13. The above noted roller guides 11, 11 couple the table 9 and the block 8 with each other, while the roller guides 11, 11 are constructed to undergo sliding movement along a border of the chain 12.

Though not shown in the figure, a pair of left and right guide pieces having an L-shape in section are formed integrally under the table 9, while a pair of guide rails (not shown) are disposed leftward and rightward sectionally of the ball screw 2 in a parallel manner. Each guide piece of L-shape is slideably engaged with the corresponding guide rail.

Next, a description is given for operation of the table feeder constructed as described above. In this embodiment, the motor 5 is actuated to rotate in forward and reverse direction, hence the ball screw 2 is rotated around its axis in a forward and reverse direction. The block 8 reciprocates in the axial or feed direction of the ball screw 2 together with the feed nut 7 which follows the rotation of the ball screw 2. A drive force of the reciprocating block 8 is transferred to the table 9 through the roller guide 11 and the fitting plate 10, thereby feeding the table 9 in reciprocating manner.

During the course of the reciprocating movement of the table 9, the block 8 is subjected to a force in a direction transverse to the axial direction of the ball screw 2 and may deviate leftward and rightward sectionally of the ball screw 2 due to angular deflection of the feed nut 7. In such a case, the roller guide 11 slides leftward and rightward sectionally of the ball screw 2 along the border of the chain 12 in response to the angular deflection to thereby absorb the deviation of the block 8. Thus the horizontal slide mechanism constitutes force absorbing means for absorbing the force applied to the block 8 to prevent the applied force from being transmitted to the table 9.

Figure 2:
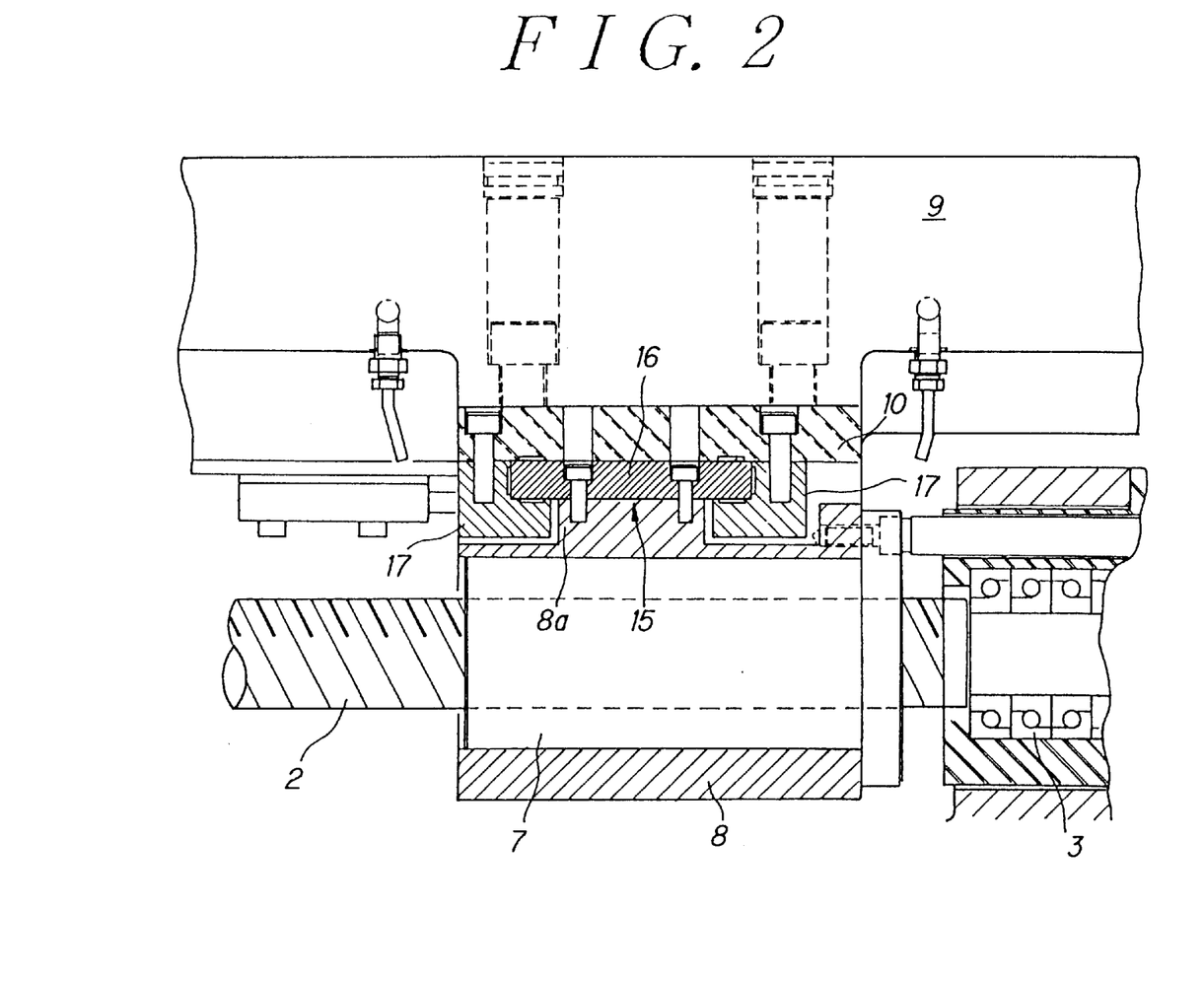
FIG. 2 is a front view of a second embodiment of the table feeder.

FIG. 2 shows a second embodiment of the inventive embodiment. In this table feeder, as shown in the figure, the horizontal slide mechanism is composed of a static bearing 15 in place of the roller guide 11 of the first embodiment. The static bearing 15 is comprised of a static piece 16 having a sectionally rectangular shape, and a pair of guide pieces 17, 17 engaged slideably on opposite sides of the static piece 16. The static piece 16 has one end disposed rightward sectionally of the ball screw 2 and another end disposed leftward sectionally of the ball screw 2, and is fixed to a mount portion 8a of the block 8 by means of screws. Both of the guide pieces 17 are fixed to the fitting plate 10 by means of screws. The above noted static bearing 15 couples the table 9 and the block 8 with each other, while the static bearing 15 is constructed to undergo sliding movement along a border of the contact portion between the static piece 16 and the guide piece 17.

In the above described construction of the table feeder, the block 8 may deviate leftward and rightward sectionally of the ball screw 2 due to angular deflection of the feed nut 7. In such a case, the static bearing 15 slides leftward and rightward sectionally of the ball screw 2 along the border of the contact portion between the static piece 16 and guide piece 17 in response to the angular deflection to thereby absorb the deviation of the block 8.

Figure 3:
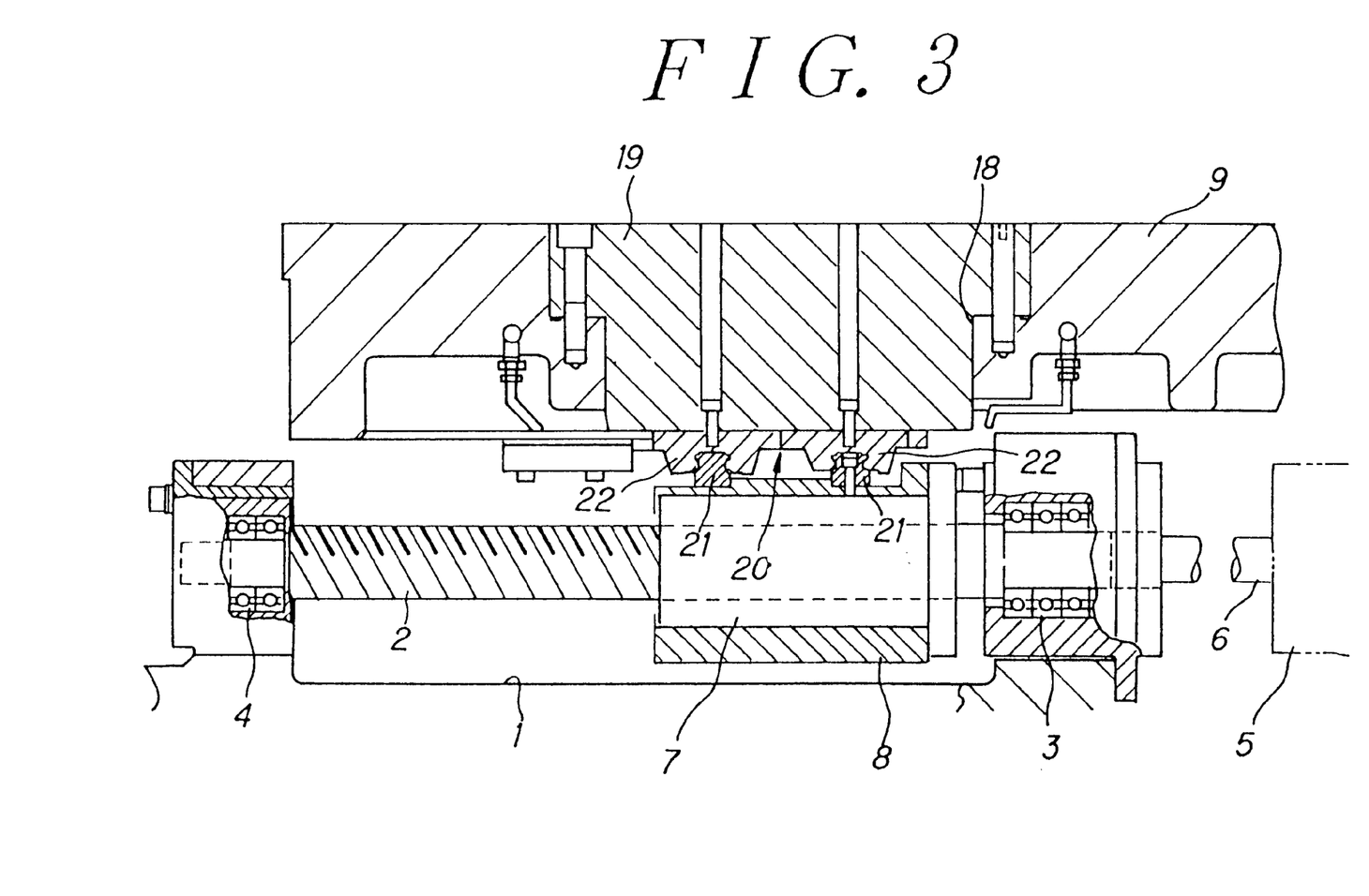
FIG. 3 is a front view of a third embodiment of the table feeder.

FIG. 3 shows a third embodiment of the inventive table feeder. In this embodiment, the table 9 is formed with a draw opening 18 for taking out the block 8. A separate block table 19 is detachably fitted into the draw opening 18. A horizontal slide mechanism is provided in the form of a linear guide 20 between the separate block table 19 and the block 8. This linear guide 20 is comprised of a pair of guide rails 21, 21 and a pair of slide pieces 22, 22 slideably engaged with the respective guide rails 21. Each guide rail 21 has one end disposed rightward sectionally of the ball screw 2 and another end disposed leftward sectionally of the ball screw 2, and is fixed to the block 8 by means of screws. The slide pieces 22 are fixed to the separate block table 19 by means of screws. The above noted linear guide 20 couples the separate block table 19 and the block 8 with each other, while the linear guide 20 is constructed to undergo sliding movement along a border of the contact portion between the guide rail 21 and the slide piece 22.

In the above described construction of the table feeder, the block 8 may deviate leftward and rightward setionally of the ball screw 2 due to angular deflection of the feed nut 7. In such a case, the linear guide 20 slides leftward and rightward sectionally of the ball screw 2 along the border of the contact portion between the guide rail 21 and slide piece 22 in response to the angular deflection to thereby absorb the deviation of the block 8.

During maintenance work of the above described linear guide 20, after removing the ball screw 2 and the feed nut 7 from the block 8, the separate block table 19 is detached from the draw opening 18. Then, the linear guide 20, block 8 and feed nut 7 are taken out together with the separate block table 19 through the draw opening 18. Namely, the maintenance work of the linear guide 20 is carried out by just removing the separate block table 19 from the draw opening 18, without overhauling the whole table feeder structure.

Figure 4:
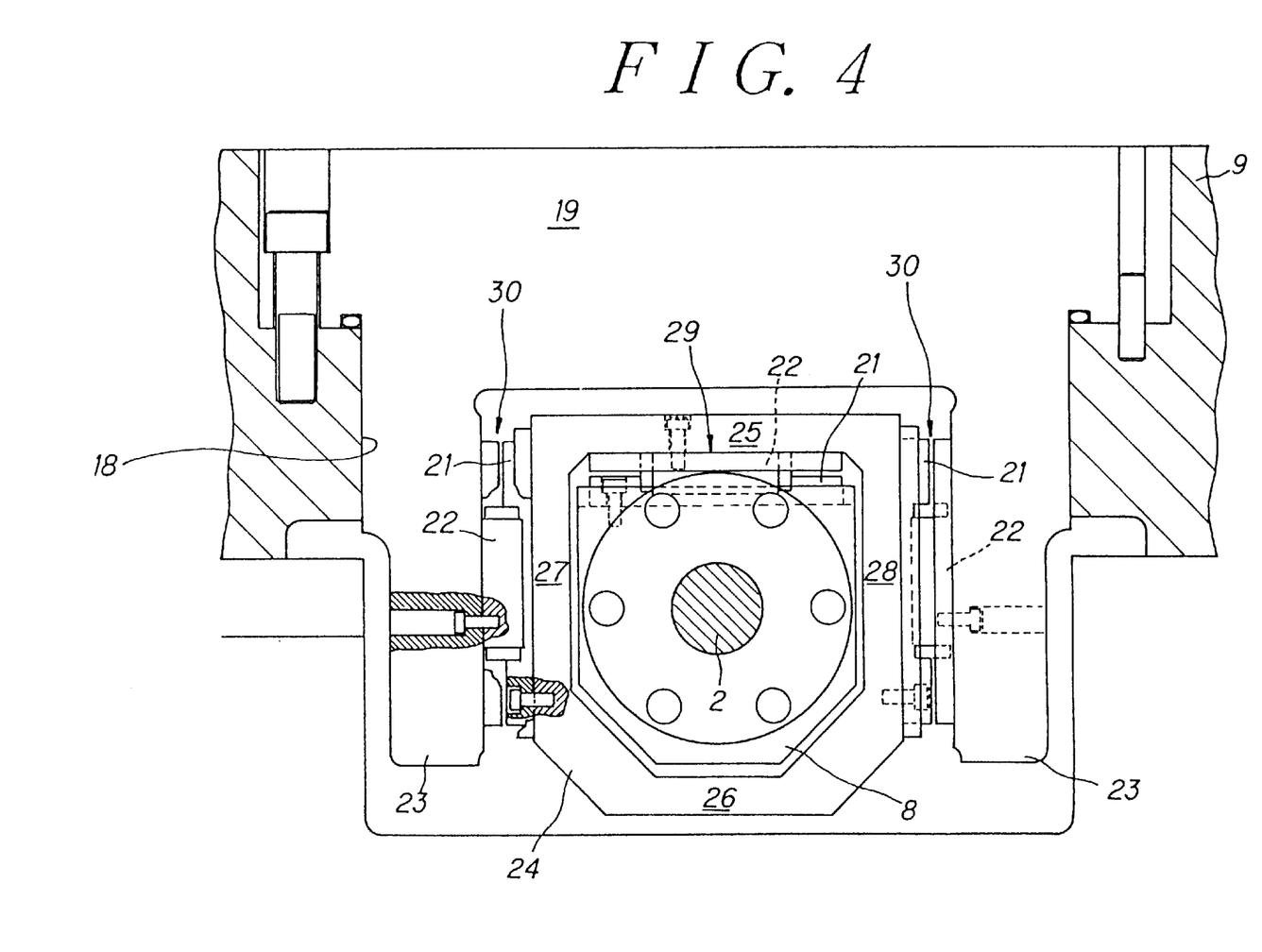
FIG. 4 is a sectional diagram showing a fourth embodiment of the table feeder.

FIG. 4 shows a fourth embodiment of the inventive table feeder. In this embodiment, the table 9 is formed with a draw opening 18 for taking out the block 8. A separate block table 19 is detachably fitted into the draw opening. A pair of support arms 23, 23 are formed integrally under a bottom face of the separate block table 19, and are disposed leftward and rightward transversely of the ball screw 2, respectively, so that the support arms are opposed to each other with respect to the ball screw 2 within the draw opening 18.

An intermediate coupling member 24 is provided between the separate block table 19 and the block 8. This intermediate coupling member 24 is composed of a pair of top and bottom plates 25, 26 and a pair of left and right side plates 27, 28, all of which are arranged to form a rectangular tube. The pair of top and bottom plates 25, 26 are disposed upward and downward sectionally of the ball screw 2, respectively, and the left and right side plates 27, 28 are disposed leftward and rightward sectionally of the ball screw 2. A horizontal slide mechanism is provided between the intermediate coupling member 24 and the block 8 in the form of a first linear guide 29, which has the same construction as that of the linear guide 20 used in the third embodiment. Namely, the first linear guide 29 is comprised of a guide rail 21 and a slide piece 22. The guide rail 21 has one end disposed rightward transversely of the ball screw 2 and another end disposed leftward transversely of the ball screw 2, and is fixed to the block 8 by means of screws. The slide piece 22 is fixed to the top plate 25 of the intermediate coupling member 24. The above noted first linear guide 29 couples the intermediate coupling member 24 and the block 8 with each other, while the first linear guide 29 is constructed to undergo sliding movement along a border of contact portion between the guide rail 21 and the slide piece 22 in the leftward and rightward direction sectionally of the ball screw 2.

Further, a vertical slide mechanism is provided in the form of a pair of second linear guides 30 which have the same structure as that of the first linear guide 29, and which are disposed between the left side plate 27 and the separate block table 19, and between the right side plate 28 and the separate block table 19, respectively. Each second linear guide 30 has a guide rail 21 which has one end disposed upward sectionally of the ball screw 2 and another end disposed downward sectionally of the ball screw 2, and is fixed to the left side plate 27 or the right side plate 28 by means of screws. On the other hand, the slide piece 22 of the second linear guide 30 is fixed to the support arm 23 of the separate block table 19 by means of screws. The second linear guide 30 couples the intermediate coupling member 24 and the separate block table 19 with each other. The second linear guide 30 slides along a border of contact portion between the guide rail 21 and the slide piece 22 in upward and downward directions, sectionally of the ball screw 2.

In the above described construction of the table feeder, the block 8 may deviate leftward and rightward, and also upward and downward sectionally of the ball screw 2 due to angular deflection of the feed nut 7. In such a case, the first and second linear guides 29, 30 slide leftward and rightward and upward and downward sectionally, respectively, of the ball screw 2 along the border of the contact in response to the angular deflection to thereby absorb the deviation of the block 8.

Further, when carrying out maintenance work of the first and second linear guides 29, 30, after removing the ball screw 2 and feed nut 7 from the block 8, the separate block table 19 is detached from the draw opening 18. Then, the second linear guide 30, intermediate coupling member 24, first linear guide 29 and block 8 are taken out together with the separate block table 19. Namely, the maintenance work of the first linear guide 29, etc. can be effected by simply detaching the separate block table 19 from the draw opening 18 without overhauling the whole construction.

Figure 5:
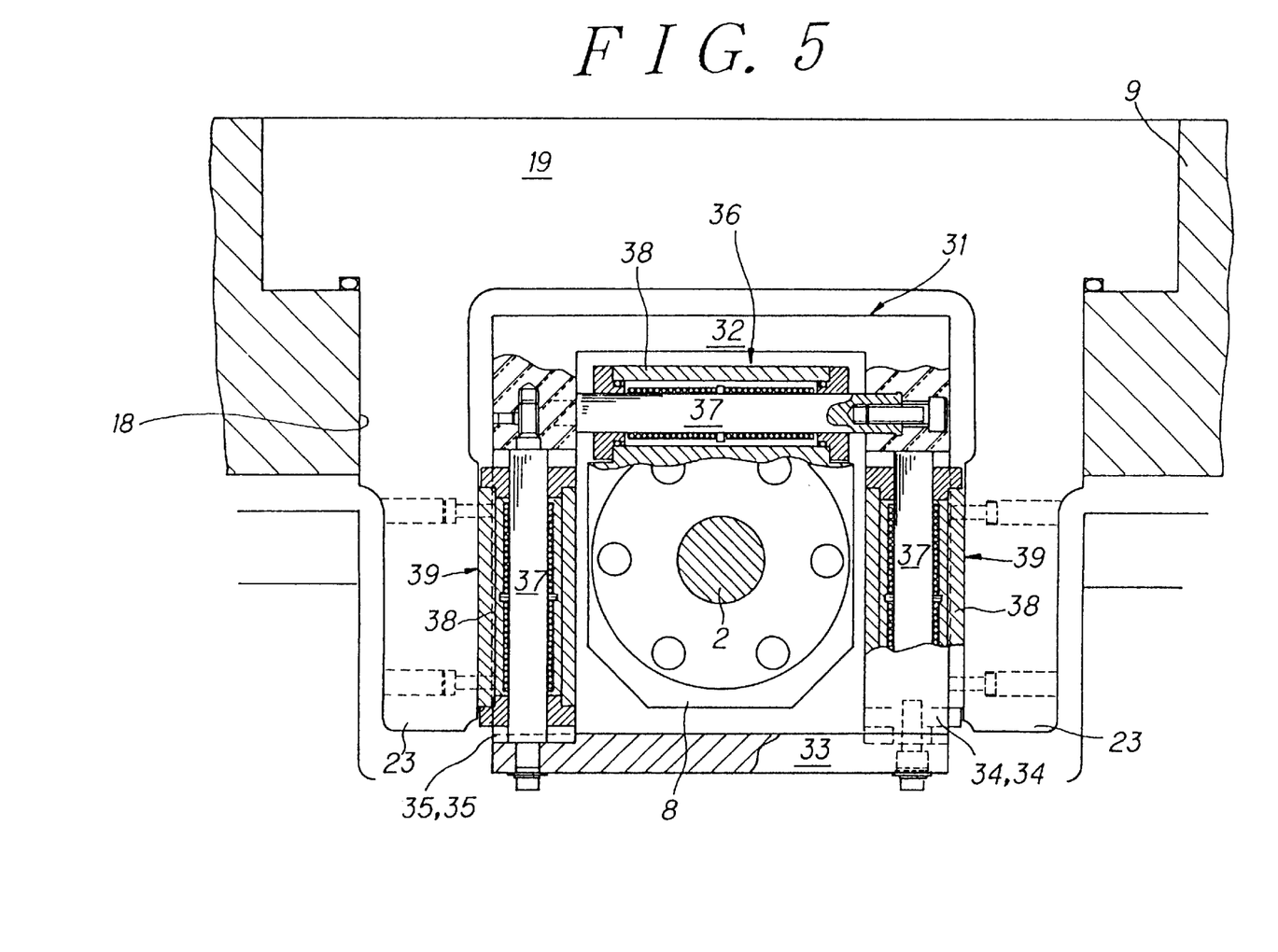
FIG. 5 is a sectional diagram showing a fifth embodiment of the table feeder.

FIG. 5 shows a fifth embodiment of the inventive embodiment. This table feeder utilizes an intermediate coupling member 31 which has a different shape than that of the tubular intermediate coupling member 24 used in the fourth embodiment. Namely, the intermediate coupling member 31 is composed of a top plate 32 having a U-shape cross section and a bottom plate 33. These plates are coupled together by four support posts 34, 34, 35 and 35. The one pair of support posts 34, 34 are disposed rightward sectionally of the ball screw 2, and the other pair of support posts 35, 35 are disposed leftward sectionally of the ball screw 2 in opposed relation to the pair of support posts 34, 34.

Further, a horizontal slide mechanism is disposed under a lower face of the top plate 32 in the form of a first linear ball bearing 36. This first linear ball bearing 36 is composed of a pair of guide bars 37, 37 and a slide member 38 slideably engaged with the guide bars 37, 37. Each guide bar has one end disposed sectionally rightward of the ball screw 2 and another end disposed sectionally leftward of the ball screw 2, and is fixed at its both ends to a side portion of the U-shape top plate 32. The slide member 38 is attached integrally to the block 8. The above noted first linear ball bearing 36 couples the intermediate coupling member 31 and the block 8 with each other, while the first linear ball bearing 36 is constructed to undergo sliding movement along a border of contact portion between the guide bar 37 and the slide piece 38 in the leftward and rightward direction sectionally of the ball screw 2.

Further, a vertical slide mechanism is provided in the form of a pair of second ball bearings 39, which are disposed between the pair of support posts 34, 34 arranged rightward sectionally of the bowl screw 2, and between the other support posts 35, 35 arranged leftward sectionally of the ball screw 2, respectively. Each of the second linear ball bearings includes a guide bar 37 which has one end disposed upward sectionally of the ball screw 2 and another end disposed downward sectionally of the ball screw 2. The one end is fixed to the top plate 32 and the other end is fixed to the bottom plate 33. A corresponding slide member 38 is fixed to the support arm 23 of the separate block table 19 by means of screws. The above noted second linear ball bearing 39 couples the intermediate coupling member 31 and the separate block table 19 with each other, while the second linear ball bearing 39 is constructed to undergo sliding movement along a border of contact portion between the guide bar 37 and the slide piece 38 in the upward and downward direction sectionally of the ball screw 2.

In the above described construction of the table feeder, the block 8 may deviate leftward and rightward, and also upward and downward sectionally of the ball screw 2 due to angular deflection of the feed nut 7. In such a case, the first and second linear ball bearings 36, 39 slide leftward and rightward and upward and downward sectionally, respectively, of the ball screw 2 along the border of the contact in response to the angular deflection to thereby absorb the deviation of the block 8.

According to the above described various embodiments, in case that the block is deviated due to angular deflection of the feed nut in a leftward and rightward direction along a sectional plane of the feed screw, the horizontal slide mechanism, such as the roller guide, slides correspondingly to that deviation amount in the leftward/rightward direction sectionally of the feed screw, thereby absorbing the deviation of the block so as to increase accuracy of the table displacement linearity.

Particularly in the fourth and fifth embodiments, in case that the block is deviated not only in leftward and rightward directions, but also in upward and downward directions of the feed screw due to angular deflection of the feed nut, the horizontal and vertical slide mechanisms, such as a linear guide, slide correspondingly to the deviation amount in the leftward/rightward direction or upward/downward direction of the ball screw so as to absorb the deviation of the block, thereby improving the displacement linearity of the table and suppressing efficiently the table deviation due to the angular deflection of the feed nut, concurrently in both of the horizontal and vertical directions.

According to the third, fourth and fifth embodiments, the maintenance work of the horizontal and vertical slide mechanisms such as a linear guide can be effected by just detaching the separate block table from the draw opening without overhauling the whole construction, thereby facilitating the maintenance work.

Though the ball screw is utilized as a feed screw in the disclosed embodiments, the invention is not limited to the use of the ball screw, but may use a feed screw having an involute thread to achieve the same effect.

According to the first aspect of the invention, as described above, the table and block are coupled by the horizontal or vertical slide mechanism slideable leftward/rightward or upward/downward sectionally of the feed screw. Thus, in case that the block is deviated due to angular deflection of the feed nut in leftward and rightward direction, or upward and downward direction along a sectional plane of the feed screw, the horizontal or vertical slide mechanism slides correspondingly to that deviation amount in leftward/rightward or upward/downward direction sectionally of the feed screw, thereby absorbing the deviation of the block so as to increase accuracy of the table displacement linearity, and to reciprocate accurately the table.

According to the second aspect of the invention, in case that the block is deviated not only in leftward and rightward direction, but also in upward and downward direction of the feed screw due to angular deflection of the feed nut, the horizontal and vertical slide mechanisms such as a linear guide can slide correspondingly to the deviation amount in the leftward/rightward direction and upward/downward direction of the ball screw so as to absorb the deviation of the block, thereby improving the displacement linearity of the table and suppressing efficiently the table deviation due to the angular deflection of the feed nut, concurrently in both of the horizontal and vertical directions, so as to reciprocate the table more accurately.

According to the third aspect of the invention, after removing the feed screw and the feed nut from the block, the separate block table is detached from the draw opening. Then, the horizontal slide mechanism and block, or the vertical slide mechanism, intermediate coupling member, horizontal slide mechanism and block are taken out together with the separate block table through the draw opening. Namely, the maintenance work of the horizontal slide mechanism, etc. is carried out by just removing the separate block table from the draw opening, without overhauling the whole table feeder, thereby facilitating the maintenance work.

What is claimed is:

1. A table feeder apparatus comprising: a feed screw supported rotatably on a base; a motor for rotating the feed screw about its axis; a feed nut mounted on the feed screw; a block mounted integrally with the feed nut; a table supported by the block for movement along an axial direction of the feed screw; a horizontal slide mechanism disposed between the block and the table, the horizontal slide mechanism being slidable in a horizontal direction along a plane transverse to the axial direction of the feed screw; and a vertical slide mechanism disposed between the block and the table, the vertical slide mechanism being slidable in a vertical direction along a plane transverse to the axial direction of the feed screw.

2. A table feeder apparatus according to claim 1; wherein the table is formed with an opening for removing the block, and further comprising a table portion removably fitted into the opening, the horizontal slide mechanism being disposed between the table portion and the block.

3. A table feeder apparatus according to claim 1; wherein the table is formed with an opening for removing the block, and further comprising a table portion removably fitted into the opening, the vertical slide mechanism being disposed between the table portion and the block.

4. A table feeder apparatus according to claim 3; further comprising a coupling member disposed between the block and the table portion; the vertical slide mechanism being disposed between the table portion and the coupling member.

5. A table feeder apparatus according to claim 4; wherein the vertical slide mechanism comprises a pair of slide members secured to the table portion; and a pair of guide rails secured to the coupling member and in sliding engagement with the slide members.

6. A table feeder apparatus according to claim 4; wherein the vertical slide mechanism comprises a pair of guide bars secured to the coupling member; and a pair of slide members secured to the block table portion and in sliding engagement with the guide bars.

7. A table feeder apparatus according to claim 2; further comprising a coupling member disposed between the block and the table portion, the horizontal slide mechanism being disposed between the block and the coupling member.

8. A table feeder apparatus according to claim 7; wherein the horizontal slide mechanism comprises a pair of slide members secured to the coupling member; and a pair of guide rails secured to the block and in sliding engagement with the slide members.

9. A table feeder apparatus according to claim 7; wherein the horizontal slide mechanism comprises a guide bar secured to the coupling member; and a slide member secured to the block and in sliding engagement with the guide bar.

10. A table feeder apparatus comprising: a table mounted to undergo movement along a feed axis; support means for supporting the table for movement along the feed axis; feed means for feeding the support means and the table supported thereby axially along the feed axis while at the same time applying a force to the support means tending to displace the support means and table in a direction transverse to the feed axis; and force absorbing means disposed between the table and the support means for absorbing the force applied to the support means to prevent the applied force from being transmitted to the table.

11. A table feeder apparatus according to claim 10; wherein the force absorbing means includes means responsive to the force applied to the support means for effecting displacement of the support means relative to the table in a direction transverse to the feed axis.

12. A table feeder apparatus according to claim 10; wherein the support means comprises a feed nut, and a support block integral with the feed nut for supporting the table; and the feed means comprises a rotationally driven feed screw threadedly engaged with the feed nut and operative when rotationally driven to axially feed the feed nut, support block and table along the feed axis while at the same time applying a force to the feed nut tending to displace the support block in a direction transverse to the feed axis.

13. A table feeder apparatus according to claim 10; wherein the force absorbing means comprises a slide mechanism slidable in at least one of a horizontal direction and a vertical direction transverse to the feed axis.

14. A table feeder apparatus according to claim 10; wherein the force absorbing means comprises a horizontal slide mechanism disposed between the support means and the table, the horizontal slide mechanism being slidable in a horizontal direction transverse to the feed axis; and a vertical slide mechanism disposed between the support means and the table, the vertical slide mechanism being slidable in a vertical direction transverse to the feed axis.

15. A table feeder apparatus according to claim 14; wherein the table has an opening, and further comprising a table portion removably fitted into the opening, the horizontal slide mechanism being disposed between the table portion and the support means.

* * * * *